CONSTANT DEVIATION RATIO FM TRANSMITTER

Filed April 9, 1965 2 Sheets-Sheet 1

INVENTORS
STANLEY H. BLACK
ROBERT S. JACOBSON
BY
ATTORNEY

CONSTANT DEVIATION RATIO FM TRANSMITTER

Filed April 9, 1965 2 Sheets-Sheet 2

INVENTORS
STANLEY H. BLACK
ROBERT S. JACOBSON
BY
S. C. Yeaton
ATTORNEY

United States Patent Office 3,396,340
Patented Aug. 6, 1968

3,396,340

CONSTANT DEVIATION RATIO FM TRANSMITTER

Stanley H. Black and Robert S. Jacobson, Phoenix, Ariz., assignors to Sperry Rand Corporation, Great Neck, N.Y., a corporation of Delaware Filed Apr. 9, 1965, Ser. No. 446,894
10 Claims. (Cl. 325—138)

ABSTRACT OF THE DISCLOSURE

A carrier oscillator output voltage is frequency modulated by a modulating signal applied to a modulator through an AGC amplifier. The modulated signal and a signal from the carrier oscillator are individually frequency translated by a predetermined factor sufficient to reduce the carrier component to zero under normal conditions. The two translated waves are applied to a phase sensitive detector in which the translated carrier oscillator signal is used as a reference. Any output of the detector represents an error signal and is used to adjust the gain of the amplifier to a level that will minimize the carrier component.

This invention relates to radio communication apparatus and in particular to radio transmitters employing frequency modulation (FM).

In many instances it is desired to keep the deviation ratio $\delta$ (i.e., the frequency deviation divided by the modulating frequency) of an FM radio signal constant as, for example, when the output signal of an RF oscillator is frequency modulated by a continuous wave (CW) modulating signal and it is specially desired to restrict the bandwidth of the FM signal to a precise amount. Also, keeping the deviation ratio constant is a requirement of systems such as are disclosed in volume 2, MIT Radiation Lab Series, "Radar Aids to Navigation" edited by John S. Hall, pp. 136–141. To keep the FM deviation ratio constant, however, requires that the gain of the modulator and the amplitude of the modulating signal be held very constant, which in prior art has meant that extremely stable components be employed in the modulation circuit, or that the instantaneous deviation ratio for the FM signal be computed and compared to a reference deviation ratio, whereby an error signal may be produced to slave the gain of the modulator circuit to a particular value.

Rather than either of the above-described techniques, the present invention keeps the deviation ratio constant by frequency translating the FM output signal of the modulator (deviation ratio $\delta_i$) to make such ratio equal a root of the Bessel function $J_0(\delta)$ of the first kind . . . whereby a carrier frequency is absented from the translated signal . . . and then controlling the gain of the modulator circuit to assure that no carrier ever appears with the translated FM signal. Thereafter, the translated FM signal may, if desired, be translated again to make the deviation ratio for the signal any given constant amount, and not subject to the gain stability of the modulator circuit.

A principal object of the invention is to provide an improved form of frequency modulation circuit.

Another object of the invention is to provide a frequency modulation transmitter in which the deviation ratio of the FM output signal is held constant.

Another object of the invention is to provide a frequency modulation transmitter which keeps the deviation ratio of an output FM signal constant by slaving the gain of the modulator circuit of such transmitter to a root of the Bessel function $J_0(\delta)$ of the first kind.

Another object of the invention is to provide a frequency modulation transmitter having means for frequency translating the FM output signal of the modulator of such transmitter to change the deviation ratio of such signal to the deviation ratio had when the Bessel function $J_0(\delta)$ equals one of its roots, and means for varying the gain of the modulator to keep the deviation ratio of the translated signal always equal to such Bessel function root.

The invention will be described with reference to the figures wherein.

Figure 1:
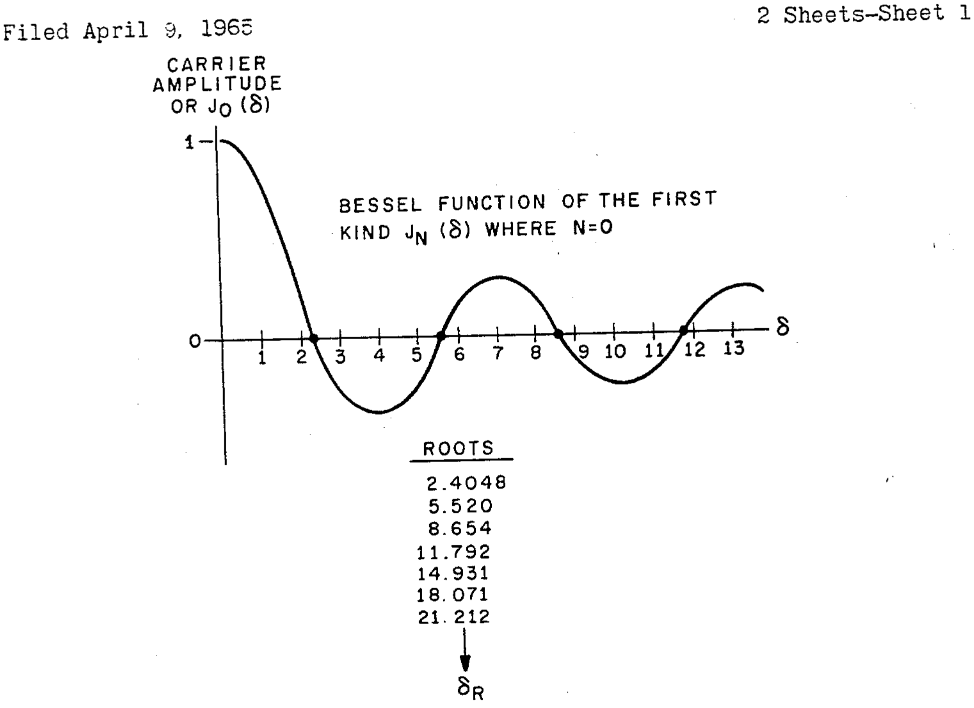
FIG. 1 is a Bessel function diagram useful in describing the invention.

The diagram of FIG. 1 is taken from the textbook Electron Tube Circuits by Samuel Seely, McGraw-Hill Book Company, New York, 1950, on p. 367, and shows that the value of the Bessel function $J_N(\delta)$, where the carrier frequency component of an FM wave occurs when N equals zero, becomes zero for certain discrete values of the deviation ratio $\delta$, which discrete values are termed Bessel function "roots" (some of which are listed in the table of FIG. 1). The diagram of FIG. 1 is a plot of Equations 17–21 of Seely's text, also appearing on p. 367, and the roots are such values of the deviation ratio $\delta$ as will make the Bessel function equate to zero. As shown in FIG. 1, the amplitude of the carrier component, like the Bessel function $J_0(\delta)$ itself, depends on the magnitude of the deviation ratio $\delta$, and that at each cross-over (root occurrence) location on the plot a reversal occurs in the sign of the function, i.e., the phase of the carrier component also reverses. Attention is now called to Electronic and Radio Engineering by Frederick E. Terman, McGraw-Hill Book Company, New York, 1955, where (on p. 589) it is pointed out that the ratio of frequency deviation to modulating frequency (i.e., the deviation ratio $\delta$) of any given FM wave may be varied by frequency translating (multiplying, dividing in frequency) such FM wave. It is this fact, coupled with an understanding of the meaning of the plot of FIG. 1, that accounts for the present invention.

Figure 2:
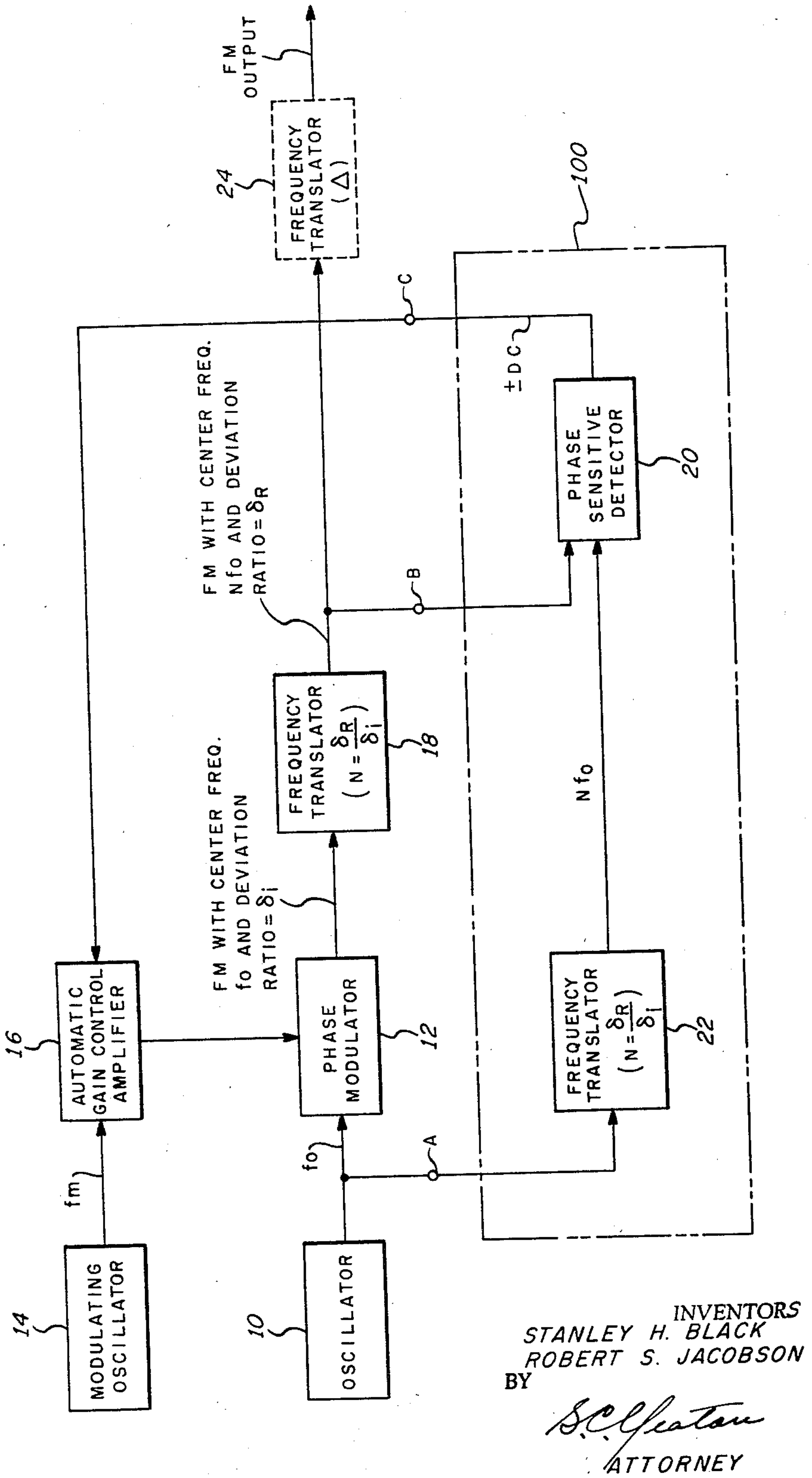
FIG. 2 is a block diagram of one embodiment of the invention.

Referring now to FIG. 2, an oscillator 10 applies a signal of frequency $f_0$ to a modulator 12 wherein the signal $f_0$ gets modulated in frequency by a modulating signal of frequency $f_m$, which latter signal is provided by an oscillator 14 and gets applied to the modulator 12 via a variable gain amplifier 16.

The FM output signal from the modulator 12, having a (carrier and) center frequency of $f_0$, and a deviation ratio $\delta_i$, is applied to a frequency translator 18, e.g. of a type as described on pp. 473–477 of Terman's text, which translator is arranged to multiply in frequency its received signal by the quantity N; while not shown, the frequency translator 18 may be a frequency divider (Terman, p. 662), and in such case the divider is arranged to divide its received signal in frequency by the quantity N. Whether the frequency translator 18 is a multiplier or divider, the operation on the deviation ratio $\delta_i$, i.e. the magnitude of the quantity N, must be such that the translated FM output has a deviation ratio $\delta_R$, viz. one of the deviation ratios for which a root of the Bessel function occurs.

As aforestated, an FM signal with a deviation ratio $\delta_R$ is one in which there is no carrier signal component. Therefore, the output signal from the translator 18 is applied to a phase sensitive detector 20, which also receives as a reference signal a signal having a frequency $Nf_0$, and which produces a D.C. signal having an amplitude proportional to the magnitude of any carrier (center frequency component $Nf_0$) contained in the FM output signal from the translator 18, and which D.C. signal has a polarity dependent on whether the deviation ratio of the FM output signal from the translator 18 is respectively more or less than a deviation ratio $\delta_R$. To provide a reference signal of frequency $Nf_0$ for the phase sensitive detector 20, a frequency translator 22 (like the translator 18) is employed and adapted to multiply in frequency the oscillator 10 output signal by the quantity N. The D.C. output signal, if any, from the detector 20 is then applied in feedback fashion to control the gain of the amplifier 16, and hence keep the deviation ratio $\delta_i$ of the modulator FM output signal constant, the object of the invention being thereby achieved. (While not shown, it is understood that preferably all high frequency components which pass through the detector 20 are filtered from the detector 20 D.C. output signal.)

If the deviation ratio $\delta_R$ of the output signal from the frequency translator 18 is satisfactory for use, it may be employed as the output signal for the circuit of FIG. 2, such signal having the advantage of a suppressed carrier. However, if the deviation ratio is desired to be some constant amount other than that for which a Bessel function root occurs, additional frequency translation in a translator 24 must be provided to vary the deviation ratio to the desired amount, whereby the translator 24 FM output signal will then be the output signal for the circuit. In this case, a constant deviation ratio still remains for the reason that the gain of the modulator circuits is still stabilized, and it is these circuits which must gradually affect the deviation ratio.

Figure 3:
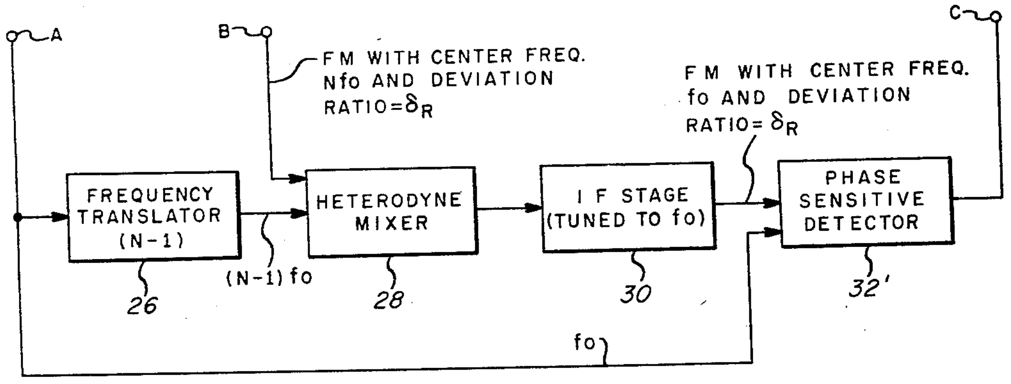
FIG. 3 is a block diagram of a circuit which may be substituted for part of the circuit of FIG. 2 to provide a presently preferred form of the invention.

By replacing the circuit 100 of FIG. 2 with the circuit of FIG. 3, the presently preferred form of the invention may be provided. This form of the invention is preferred because it enables a phase detector, more accurately, to operate in a relatively low frequency range. In FIG. 3, the oscillator 10 output signal of frequency $f_0$ is translated, by a frequency translator 26, to a frequency $(N-1)f_0$, and then mixed with the translated carrier-less FM output signal of center frequency $Nf_0$ (from the translator 18) in a heterodyning circuit 28 to provide a carrier-less difference frequency FM signal of center frequency $f_0$, which difference frequency signal passes through a properly tuned IF stage 30 to a phase detector 32'. The phase detector 32' also receives, as a reference signal, the oscillator 10 output signal of frequency $f_0$, and so long as no carrier component appears with the difference frequency FM signal, no D.C. signal is provided for feedback to the AGC amplifier 16. On appearance, however, of a carrier component with the FM difference signal, a D.C. signal (as with the detector arrangement shown in FIG. 2) having a magnitude and polarity dependent respectively on the magnitude and phase of the unwanted carrier component is provided, which D.C. signal is then applied to control the gain of the modulator circuits, whereby the translator 18 output signal is kept free of carrier components. Hence, the deviation ratios for all FM signals appearing in the circuit are stabilized.

While the invention has been described in its preferred embodiments, it is to be understood that the words which have been used are words of description rather than of limitation and that changes within the purview of the appended claims may be made without departing from the true scope and spirit of the invention in its broader aspects. For example, it would be within the scope of the invention to employ the D.C. output signal from the phase sensitive detector (32 or 32') to control the translating quantity N rather than the gain of the modulating circuits themselves, whereby the deviation ratio $\delta_i$ of the modulator 12 output signal would be free to drift, but whereby the deviation ratio of the output signal of the translator 18 would still be kept equal to $\delta_R$ by follow-up on and varying N. Also, it would be within the scope of the invention to eliminate (e.g. connect an electrical short circuit thereacross) both frequency translators 18 and 22 of FIG. 2, whereby (if the gain of the AGC amplifier 16 may be varied over a wide enough range) the gain of the modulator circuits will be driven to a point that causes the phase modulator 12 FM output signal to be stabilized at a root deviation ratio; thereafter the translator 24 may be employed to make the deviation ratio any given amount.

What is claimed is:

1. For use in an FM transmitter a circuit including modulator means for producing an FM signal, means for producing a reference signal of a frequency the same as the center frequency of said FM signal, phase sensitive detector means adapted to receive the reference and FM signals to produce a D.C. signal of a sense and magnitude proportional to any signal component in the FM signal that has the frequency of the reference signal, and means responsive to said D.C. signal for varying the degree of modulation provided by said modulator means in the direction that tends to cancel said D.C. signal, whereby no significant signal component of the frequency of said reference signal occurs with the FM signal, and whereby the deviation ratio of that FM signal is stabilized.

2. The apparatus of claim 1 including additional means connected to receive the FM signal for frequency translating such signal to provide a second FM signal having a deviation ratio of any desired amount.

3. Frequency modulation apparatus comprising means for producing a first FM signal of a particular quiescent deviation ratio, means for translating in frequency said FM signal to produce a second FM signal having a deviation ratio for which a Bessel function root occurs for the carrier component of said second FM signal, means for producing a control signal when there is a carrier component with said second FM signal, and means responsive to said control signal for varying the deviation ratio of said first FM signal in a direction that tends to cancel said control signal.

4. The apparatus of claim 3 including means adapted to receive said second FM signal for frequency translating that signal to produce a third FM signal having a deviation ratio of any given constant amount.

5. Frequency modulation apparatus comprising means for producing a first signal of a first frequency, means for producing a second signal of a higher frequency, means including a phase modulator circuit and an amplifier, said amplifier receiving said first signal and applying its output to said modulator circuit, said modulator circuit also receiving said second signal, whereby the second signal is frequency modulated by the first signal to produce a first FM signal having a quiescent deviation ratio, means for translating in frequency the first FM signal to produce a second FM signal having a quiescent deviation ratio which is such that no carrier normally appears with the second FM signal, means for detecting the presence of any carrier appearing with said second FM signal to produce a representative error signal, and means for varying the gain of said amplifier in proportion to said error signal in a direction that tends to cancel any carrier component in said second FM signal.

6. The apparatus of claim 5 including means adapted to receive said second FM signal for frequency translating said second FM signal to produce a third FM signal having a deviation ratio of any given amount.

7. Frequency modulation apparatus comprising means for producing a first signal of a first frequency, means for producing a second signal of a higher frequency, means including a phase modulator circuit and an amplifier, said amplifier receiving said first signal and applying its output to said modulator circuit, said modulator circuit also receiving said second signal, whereby the second signal is frequency modulated by the first signal to produce a first FM signal having a quiescent deviation ratio, means for translating in frequency the first FM signal to produce a second FM signal having a quiescent deviation ratio which is such that no carrier normally appears with the second FM signal, means for detecting the presence of any carrier appearing with said second FM signal to produce a representative error signal, said means for detecting the presence of any carrier appearing with said second FM signal comprising means for receiving said second signal for frequency translating that signal to produce a reference signal equal in frequency to the frequency of the unwanted carrier of said second FM signal, and phase sensitive detector means receiving both the second FM signal and said reference signal and producing an error signal that is D.C. in nature, and means for varying the gain of said amplifier in proportion to said error signal in a direction that tends to cancel the carrier component in said second FM signal.

8. The apparatus of claim 7 including means adapted to receive said second FM signal for frequency translating said second FM signal to produce a third FM signal having a deviation ratio of any given amount.

9. Frequency modulation apparatus comprising means for producing a first signal of a first frequency, means for producing a second signal of a higher frequency, a frequency modulator circuit, an amplifier in said frequency modulator circuit, said amplifier receiving said first signal and applying its output to said modulator circuit, said modulator circuit also receiving said second signal, whereby the second signal is frequency modulated by the first signal to produce a first FM signal having a quiescent deviation ratio, means for translating in frequency the first FM signal to produce a second FM signal having a quiescent deviation ratio which is such that no carrier normally appears with the second FM signal, means for detecting the presence of any carrier appearing with said second FM signal to produce a representative error signal, said means for detecting the presence of any carrier appearing with said second FM signal comprising means to produce a reference signal receiving said second signal for frequency translating that signal by a quantity one magnitude different than the magnitude by which said first FM signal is translated, means for receiving both said translated signals and heterodyning them together to produce at least a difference frequency signal component, and phase sensitive detecting means receiving said difference frequency signal component and said second signal to produce an error D.C. signal representative respectively in phase and magnitude of the phase and magnitude of any center frequency component in said difference frequency signal component, and means for varying the gain of said amplifier in proportion to said error signal whereby any carrier component in said second FM signal tends to be cancelled.

10. The apparatus of claim 9 including means adapted to receive said second FM signal for frequency translating said second FM signal to produce a third FM signal having a deviation ratio of any given amount.

References Cited

UNITED STATES PATENTS

| | | | |
|---|---|---|---|
| 2,114,333 | 4/1938 | Conklin | 325—146 |
| 2,246,164 | 6/1941 | Crosby | 325—145 |
| 2,293,022 | 8/1942 | Crosby | 325—134 |
| 2,492,218 | 12/1949 | Guanella | 332—41 X |
| 2,590,784 | 3/1952 | Moulton | 332—19 |
| 3,258,694 | 6/1966 | Shepherd | 325—145 |

ROBERT L. GRIFFIN, *Primary Examiner.*

B. V. SAFOUREK, *Assistant Examiner.*